(12) United States Patent
Dishman et al.

(10) Patent No.: US 8,572,897 B2
(45) Date of Patent: Nov. 5, 2013

(54) WEATHERSTRIP CINCH CLIP

(75) Inventors: Todd William Dishman, West Bloomfield, MI (US); Tracy Christopher Bakos, Commerce, MI (US); Jim Antime Marleau, Canton, MI (US); Ken Michael Reo, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/232,078

(22) Filed: Sep. 14, 2011

(65) Prior Publication Data

US 2013/0061532 A1    Mar. 14, 2013

(51) Int. Cl.
*E06B 7/16* (2006.01)

(52) U.S. Cl.
USPC ........... 49/490.1; 49/495.1; 49/479.1; 49/377

(58) Field of Classification Search
USPC ............. 49/490.1, 440, 441, 374, 377, 475.1, 49/495.1, 479.1
See application file for complete search history.

(56) References Cited

U.S. PATENT DOCUMENTS

| | | | | |
|---|---|---|---|---|
| 1,972,283 A * | 9/1934 | Zimmers | 280/163 |
| 3,290,082 A * | 12/1966 | Fritsch | 293/128 |
| 3,388,523 A * | 6/1968 | Evans | 52/716.5 |
| 3,451,709 A * | 6/1969 | Swauger | 293/128 |
| 3,506,294 A * | 4/1970 | Newman | 293/128 |
| 3,575,371 A * | 4/1971 | Carlstedt | 248/215 |
| 3,742,649 A * | 7/1973 | Dochnahl | 49/441 |
| 3,802,032 A * | 4/1974 | Weed | 24/66.13 |
| 3,908,312 A * | 9/1975 | Pennec | 49/493.1 |
| 4,083,592 A * | 4/1978 | Rubin et al. | 52/717.05 |
| 4,463,539 A * | 8/1984 | Simon | 52/716.5 |
| 4,911,349 A * | 3/1990 | Miller | 224/326 |
| 5,054,240 A * | 10/1991 | Nakahara et al. | 49/479.1 |
| 5,111,617 A * | 5/1992 | Saiga | 49/493.1 |
| 5,363,537 A * | 11/1994 | Schneider et al. | 24/289 |
| 5,376,423 A * | 12/1994 | Wiegand | 428/99 |
| 5,799,442 A * | 9/1998 | Takahashi et al. | 49/377 |
| 6,401,394 B2 * | 6/2002 | Nozaki | 49/377 |
| 6,409,251 B1 * | 6/2002 | Kaye et al. | 296/146.9 |
| 6,748,702 B2 * | 6/2004 | Jang | 49/475.1 |
| 6,966,601 B2 * | 11/2005 | Matsumoto et al. | 296/146.2 |
| 7,055,291 B2 * | 6/2006 | Nakanishi et al. | 52/716.5 |
| 7,390,050 B2 * | 6/2008 | Nakao et al. | 296/146.1 |
| 7,407,205 B2 * | 8/2008 | Nakao et al. | 293/128 |
| 7,458,185 B2 * | 12/2008 | Imaizumi et al. | 49/377 |
| 8,001,727 B2 * | 8/2011 | Ho et al. | 49/377 |
| 8,205,389 B1 * | 6/2012 | Kesh | 49/440 |
| 2005/0198908 A1 * | 9/2005 | Imaizumi et al. | 49/490.1 |
| 2009/0183435 A1 | 7/2009 | Daio et al. | |
| 2010/0313487 A1 * | 12/2010 | Ellis et al. | 49/502 |

* cited by examiner

*Primary Examiner* — Katherine Mitchell
*Assistant Examiner* — Shiref Mekhaeil
(74) *Attorney, Agent, or Firm* — Raymond Coppiellie; Price Heneveld LLP

(57) ABSTRACT

A weatherstrip cinch clip for an automobile including a substantially vertically aligned first wall, a substantially vertically aligned second wall extending substantially perpendicularly to the first wall, and a substantially horizontally aligned prong extending away from the second wall in a direction substantially parallel to the first wall, wherein the prong is configured to extend substantially within a prong receiving aperture.

17 Claims, 3 Drawing Sheets

WEATHERSTRIP CINCH CLIP

FIELD OF THE INVENTION

The present invention generally relates to an automobile retention structure, and more particularly to a weatherstrip securing clip.

BACKGROUND OF THE PRESENT INVENTION

Side door glass seal weatherstrips are often pushed horizontally onto a door flange for mounting. During assembly, an installation operator is often uncertain of full insertion of the weatherstrip. If the weatherstrip is not fully inserted, there may be glass cycling and/or sealing failures. Based on the nature of the retention and assembly method (i.e. pushing horizontally onto a flange from the outside direction), it proves difficult to provide cover to the backside of the door frame. Packaging is also a concern, as any retention or cover must fit within a tight space, so as to not excessively contact the vehicle body upon closure or slamming of the door.

Accordingly, an apparatus is desired having the aforementioned advantages and solving and/or making improvements on the aforementioned disadvantages.

SUMMARY OF THE PRESENT INVENTION

One aspect of the present invention provides a weatherstrip cinch clip for an automobile including a substantially vertically aligned first wall. The clip also includes a substantially vertically aligned second wall extending substantially perpendicularly to the first wall. The clip further includes a substantially horizontally aligned prong extending away from the second wall in a direction substantially parallel to the first wall, wherein the prong is configured to extend substantially within a prong receiving aperture.

Another aspect of the present invention provides an automobile door including a door frame having a portion of door sheet metal. The door also includes a weatherstrip operably connected to the portion of door sheet metal. The door further includes a substantially L-shaped cinch clip having a first wall, a second wall, and a planar member extending from the second wall, wherein the planar member extends within a receiving aperture, and wherein the cinch clip securely retains the weatherstrip to the portion of door sheet metal.

Yet another aspect of the present invention provides a method for making an automobile door including the step of providing a door frame having a portion of door sheet metal; a weatherstrip; and a substantially L-shaped cinch clip having a first wall, a second wall, and a prong extending from the second wall. The method also includes the step of operably connecting the weatherstrip to the door frame. The method further includes the step of pushing the cinch clip from a car rearward direction forwardly onto the door frame, wherein the prong extends within the weatherstrip, and wherein the first wall extends around the portion of door sheet metal.

These and other aspects, objects, and features of the present invention will be understood and appreciated by those skilled in the art upon studying the following specification, claims, and appended drawings.

DETAILED DESCRIPTION OF EMBODIMENTS

Figure 1:
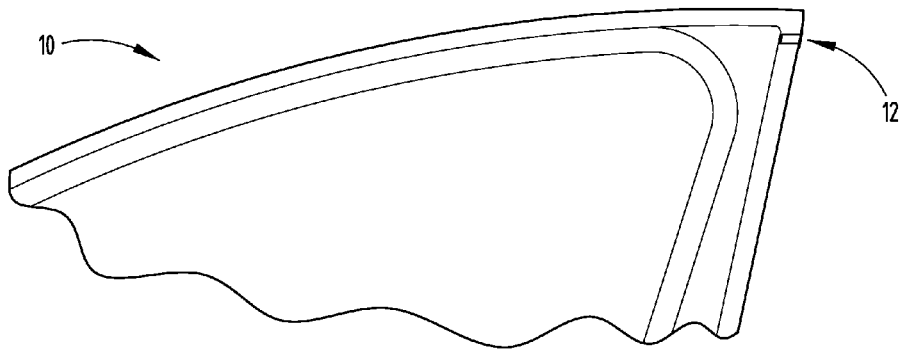
FIG. 1 is a side elevational view of an automobile door having a cinch clip.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
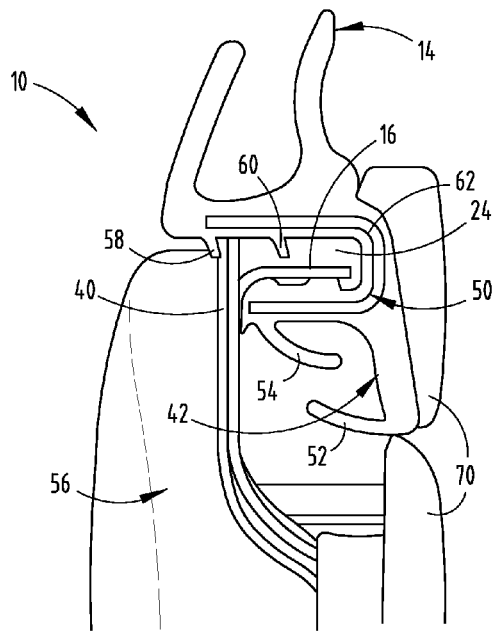
FIG. 2 is a rear elevational view of a weatherstrip in connection with the automobile door.

Referring now to FIGS. 1 and 2, the reference numeral 10 generally designates an automobile door, and more specifically an outer panel of the automobile door. The automobile door includes a door frame 56 that comprises, in part, a portion of door sheet metal 40. The door frame 56 also includes a glass run 42 that functions to retain a door glass (not illustrated). The door glass may be fixed or movable, and in the case of a movable door glass the glass run 42 retains the door glass during travel of the door glass. The glass run 42 includes sealing lips 52, 54. The sealing lips 52, 54 are to be slidably contacted by an outer surface and top edge of the door glass. Adjacent the door frame 56 may be one or more exterior trim components 70, such as an appliqué, for example.

A weatherstrip 14 includes a mounting portion 50 which may be mounted onto a mounting flange 16 of the door sheet metal 40. The mounting flange 16 is illustrated as having a substantially horizontal orientation, but it is conceivable that the mounting flange 16 may be oriented in various other angular configurations, including that of a vertical orientation. Such variation is adapted to suit the application that the weatherstrip 14 is employed for the mounting portion 50 of the weatherstrip 14 also includes a first downwardly facing notch 58 and a second downwardly facing notch 60. Additionally, the mounting portion 50 of the weatherstrip 14 may optionally include a metal carrier 62 to enhance the structural rigidity of the weatherstrip 14. The majority of the weatherstrip 14, with the exception of the optional metal carrier 62, is made of a rubber or rubber-like elastic body such as a thermoplastic elastomer.

Installation of the weatherstrip 14 onto the door frame 56 and/or the door sheet metal 40 is accomplished by pushing the weatherstrip 14 in a horizontal direction from an outboard surface of the automobile door 10 towards an inboard region of the automobile door 10. More specifically, the mounting portion 50 of the weatherstrip 14 is pushed onto the mounting flange 16 of the door sheet metal until fully engaged. In the installed position, the mounting portion 50 of the weatherstrip 14 and the mounting flange 16 of the door sheet metal 40 form a prong receiving aperture 24 that extends from a location proximate the upper, rearward edge of the automobile door 10. Several portions of this disclosure refer to a front door of an automobile, however, it is important to note that there are additional automobile locations that may employ such a weatherstrip 14. The weatherstrip 14 may be mounted to a front door, a rear door, a liftgate, and/or a moonroof. These are merely a few examples of applications where such a weatherstrip 14 may be employed. In such cases, the prong receiving aperture 24 may be located in various other automobile locations, rather than the upper, rearward edge of the automobile door 10.

Figure 3:
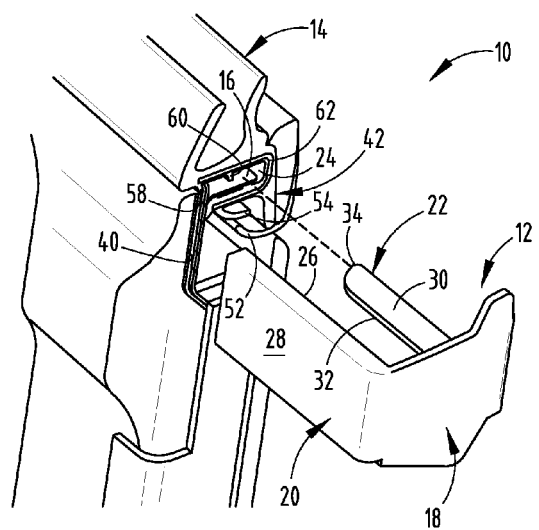
FIG. 3 is a rear perspective view of the cinch clip prior to engagement with the weatherstrip and automobile door.
Figure 4:
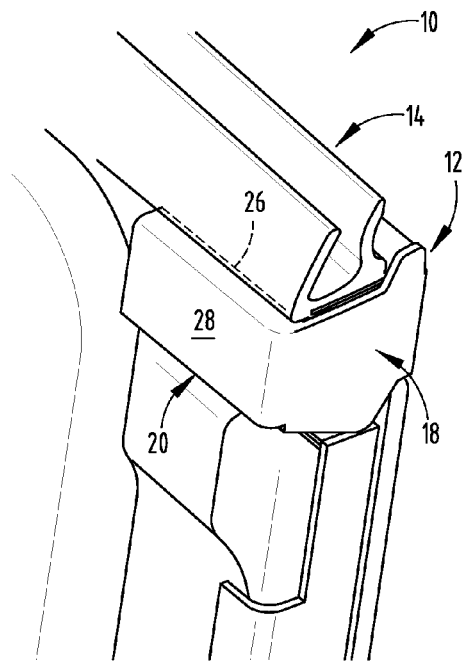
FIG. 4 is a rear perspective view of the cinch clip securing the weatherstrip.
Figure 4A:
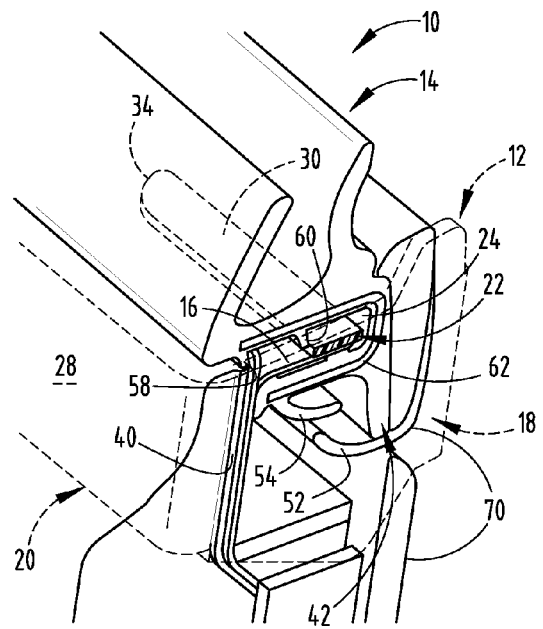
FIG. 4A is a rear perspective view of the cinch clip in phantom securing the weatherstrip.
Figure 5:
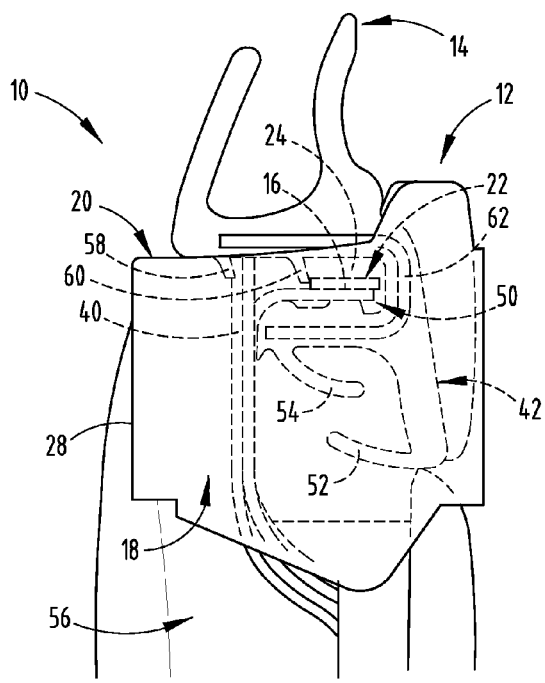
FIG. 5 is a rear elevational view of the cinch clip securing the weatherstrip.
Figure 6:
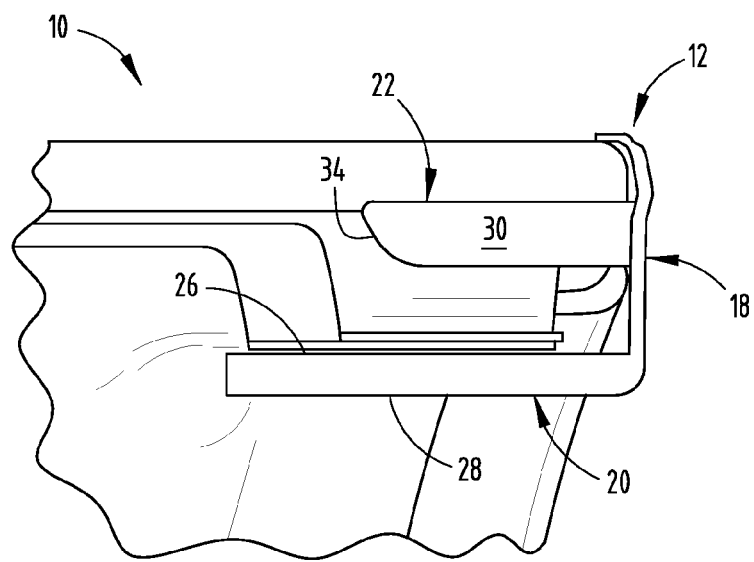
FIG. 6 is a top plan view of the cinch clip in connection with the automobile door.
Figure 7:
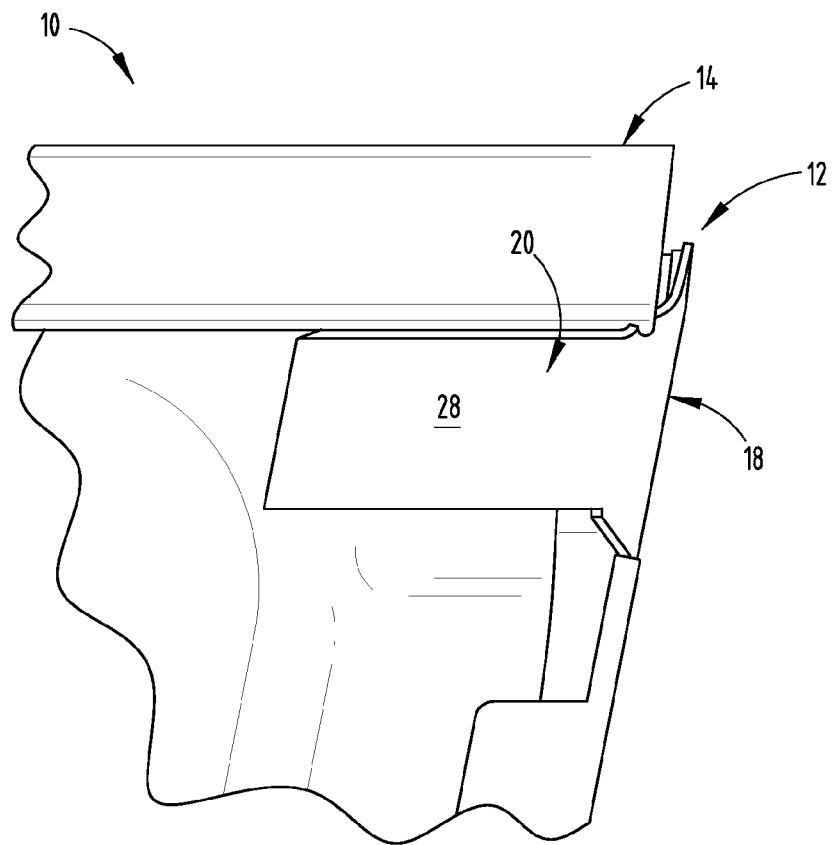
FIG. 7 is a side elevational view of the cinch clip securing the weatherstrip.

Referring to FIG. 3, a cinch clip 12 is illustrated in a pre-installation position. The cinch clip 12 may optionally be formed from a molded plastic material, or the like, and substantially comprises an L-shape that is defined by a first wall 20 and a second wall 18. The first wall 20 includes an inner surface 26 and an outer surface 28 and has a longitudinal direction that is substantially parallel to the longitudinal direction of the automobile door 10. The first wall 20 is aligned in a substantially vertically aligned arrangement. The second wall 18 is substantially vertically aligned and extends in a direction substantially perpendicular to the first wall 20. Integrally formed with, and extending away from, the second wall 18 is a substantially flat, slot-like prong 22 that includes a top surface 30 and a bottom surface 32.

The prong 22 also includes a front edge portion 34. The prong 22, similar to the first wall 20, has a longitudinal axis substantially parallel to the longitudinal direction of the automobile door 10. The prong 22 may be of a horizontally planar orientation and may have a length as long as or greater than the length of the first wall 20, however, in most cases it will be sufficient for the length of the prong 22 to be less than the length of the first wall 20. For example, the prong 22 may have a length approximately one-half of that of the first wall 20, but this length will depend on the structural requirements of the application. The prong 22 has a width that is substantially equal to that of the prong receiving aperture 24, and is more specifically defined by the prong receiving aperture 24 that extends to the second notch 60 of the mounting portion 50 of the weatherstrip 14. Upon full insertion of the weatherstrip 14 onto the mounting flange 16, the cinch clip 12 is capable of being installed. On the other hand, if the weatherstrip 14 is not fully installed, the second notch 60 will prevent the prong 22 of the cinch clip 12 from entering the prong receiving aperture 24.

Referring now to FIGS. 4-7, the weatherstrip 14 and the cinch clip 12 are shown in respective fully installed positions. When the cinch clip 12 is in the fully installed position, the prong 22 snuggly fits within the prong receiving aperture 24 defined by the mounting portion 50 of the weatherstrip 14 and the mounting flange 16 of the door sheet metal 40. More specifically, the second notch 60 of the weatherstrip 14 may function to, at least in part, provide a snug engagement of the prong 22 within the prong receiving aperture 24. Additionally, when the cinch clip 12 is in the fully installed position, the inner surface 26 of the first wall 20 is in tight engagement with the door sheet metal 40. The cinch clip 12 also may include a retention feature, such as a barbed protrusion that is configured to engage an aperture in the sheet metal (or other component). Such an arrangement facilitates secure retention of the cinch clip 12 in a longitudinal direction. A snap fit engagement also provides an installation operator confirmation that the cinch clip 12 has been fully inserted. The retention feature may be present, for example, on the inside or outside surface of the first wall 20, but it is conceivable that the retention feature is located on a surface of the prong 22. The prong receiving aperture 24 may be defined by components other than configuration described above. The prong receiving aperture 24 may be defined and substantially disposed within a number of other components including either singularly or in combination, but not limited to, the glass run 42, an exterior trim component 70, and/or the segment of sheet metal 40.

It should be noted that the cinch clip 12, although illustrated and described in part as being located at a top, rear region of a front automobile door, may be employed in other automobile locations. As disclosed above, the weatherstrip 14 may be mounted to various regions of the automobile and the cinch clip 12 may be associated with the weatherstrip 14 in these various regions. In this respect, the prong receiving aperture 24 may be located in any number of automobile components.

Specifically, the cinch clip 12 may be used directly or indirectly in conjunction with an outer belt of the vehicle, a quarter glass panel, a door cladding, and/or an interior trim component. This would allow the cinch clip 12 to provide installation and retention capabilities for components associated with doors, liftgates, sliders, etc.

The snug engagement of the cinch clip 12 with the aforementioned components provides cross car retention between two or more of the weatherstrip 14, the glass run 42, the door sheet metal 40, and/or various other automobile components, such as a trim component 70. While providing structural support, the cinch clip 12 also functions to provide an installation operator positive confirmation that the weatherstrip 14 has been fully installed onto the automobile door 10, and more specifically the mounting flange 16, or to another automobile structure suitable for other applications.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A cinch clip for a weatherstrip of a vehicle, comprising:
 a substantially vertically aligned first wall;
 a substantially vertically aligned second wall extending substantially perpendicularly to the first wall;
 a receiving aperture between the weatherstrip and a door frame of the vehicle; and
 a substantially horizontally aligned prong extending away from the second wall in a direction substantially parallel to the first wall, wherein the prong is configured to extend substantially within the receiving aperture and wherein the first wall of the cinch clip engages an opposite side of the door frame from the weatherstrip to retain the weatherstrip to the door frame.

2. The cinch clip for a weatherstrip of a vehicle of claim 1, wherein the cinch clip is comprised of a molded plastic material.

3. The cinch clip for a weatherstrip of a vehicle of claim 1, wherein the cinch clip is located proximate an end of an automobile door.

4. The cinch clip for a weatherstrip of a vehicle of claim 1, wherein the receiving aperture is substantially disposed within a portion of the weatherstrip.

5. The cinch clip for a weatherstrip of a vehicle of claim 1, wherein the receiving aperture is substantially disposed within a glass run of the door frame.

6. The cinch clip for a weatherstrip of a vehicle of claim 1, wherein the receiving aperture is substantially disposed within a portion of a trim component.

7. The cinch clip for a weatherstrip of a vehicle of claim 1, wherein the weatherstrip has a mounting channel that engages a flange of the door frame, and wherein the mounting channel includes a notch to abut the flange and define the receiving aperture.

8. The cinch clip for a weatherstrip of a vehicle of claim 1, wherein the prong has a first length of approximately one-half of a second length of the first wall.

9. An automobile door, comprising:
   a door frame having a substantially planar flange extending from a first side;
   a weatherstrip operably connected to the flange and having a notch abutting the flange to define a receiving aperture therebetween; and
   a substantially L-shaped cinch clip having a first wall, a second wall, and a planar member extending from the second wall to engage the receiving aperture, wherein the first wall of the cinch clip engages a second side of the door frame to retain the weatherstrip to the door frame.

10. The automobile door of claim 9, wherein the cinch clip is comprised of a molded plastic material.

11. The automobile door of claim 9, wherein the cinch clip is located proximate an end of the automobile door.

12. The automobile door of claim 9, wherein the weatherstrip includes a glass run to retain a door glass that is orthogonal to the flange.

13. The automobile door of claim 9, wherein the planar member is substantially disposed between the flange and the weatherstrip and abutting the notch of the weatherstrip.

14. The automobile door of claim 9, wherein the planar member is substantially disposed within a portion of a trim component.

15. The automobile door of claim 9, wherein the planar member is substantially disposed within a hole on the door frame.

16. The automobile door of claim 9, wherein the first wall has a longitudinal axis.

17. The automobile door of claim 16, wherein the planar member extends in direction substantially parallel to the longitudinal axis of the first wall.

* * * * *